(12) United States Patent
Smith

(10) Patent No.: US 6,489,889 B1
(45) Date of Patent: Dec. 3, 2002

(54) OCCUPANT SENSING SYSTEM

(75) Inventor: Craig Smith, South Lyon, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,601

(22) Filed: Jan. 24, 2002

(51) Int. Cl.[7] .............................................. B60Q 1/00
(52) U.S. Cl. ................... 340/457; 340/573.1; 340/522; 340/457.1; 340/459; 340/686.4; 180/271; 180/272; 180/286; 180/287
(58) Field of Search ............................ 340/573.1, 522, 340/426, 439, 425.5, 428, 438, 456, 457, 457.1, 459, 460, 461, 462, 667, 669, 686.1, 687, 686.4; 701/36, 39, 45; 180/270, 271, 287, 286, 272; 280/735, 801.1

(56) References Cited

U.S. PATENT DOCUMENTS

| | | | |
|---|---|---|---|
| 5,260,684 A | | 11/1993 | Metzmaker ............... 340/457.1 |
| 5,335,748 A | * | 8/1994 | Wilson ........................ 180/270 |
| 5,558,370 A | * | 9/1996 | Behr ........................... 280/806 |
| 5,659,289 A | | 8/1997 | Zonkoski et al. ........... 340/438 |
| 5,760,684 A | * | 6/1998 | Orbach ..................... 340/457.1 |
| 5,793,291 A | | 8/1998 | Thornton ................. 340/573.1 |
| 5,949,340 A | * | 9/1999 | Rossi ....................... 340/573.1 |
| 5,966,070 A | | 10/1999 | Thornton ................. 340/425.5 |
| 6,028,509 A | | 2/2000 | Rice .............................. 340/449 |
| 6,104,293 A | * | 8/2000 | Rossi ....................... 340/573.1 |
| 6,222,442 B1 | | 4/2001 | Gager et al. ................. 340/426 |
| 6,263,272 B1 | | 7/2001 | Liu et al. ....................... 701/49 |
| 6,353,383 B1 | * | 3/2002 | Gross et al. ............. 340/425.5 |
| 6,390,529 B1 | * | 5/2002 | Bingle et al. ................. 296/76 |
| 6,393,348 B1 | * | 5/2002 | Ziegler et al. ................ 701/45 |
| 6,278,358 B1 | * | 8/2002 | Spoto et al. ............. 340/425.5 |

* cited by examiner

*Primary Examiner*—Benjamin C. Lee
(74) *Attorney, Agent, or Firm*—Gregory P. Brown

(57) ABSTRACT

Occupant sensing system (12) for detecting the presence of an occupant within an automotive vehicle (10) includes a seat belt sensor (14) for detecting a buckled condition of the seat belt. An ignition sensor (24) generates an ignition-off signal. An indicator (30) is coupled to a controller (20), the seat belt sensor (22), and the ignition sensor (18). The controller controls the indicator in response to the seat belt buckled signal and ignition-off signal.

20 Claims, 3 Drawing Sheets

OCCUPANT SENSING SYSTEM

BACKGROUND OF INVENTION

The present invention relates generally to occupant sensing for automotive vehicles, and more particularly, to signaling the vehicle operator in response to a person being left in the vehicle.

Motor vehicles typically have a seat belt sensor that is used to detect the buckle being buckled or unbuckled. The sensing of the buckled or unbuckled state is performed after the ignition is started. An indicator is used to remind the vehicle operator to fasten the seat belt. Vehicles typically have only a driver seat belt sensor while the remaining seats do not have a seat belt sensor.

When transporting children, instances have been noted where children have been left in a vehicle for prolonged periods. This may happen especially for sleeping infants who make no noise. Thus the vehicle operator may forget about the infant. No means is currently provided for reminding a vehicle operator for the presence of other occupants.

Occupant sensing systems are known in which the temperature is detected and a motion detector is used to sense movement within the vehicle when the temperature is above an extreme temperature or below an extreme temperature. One problem with such a system is that at the time the vehicle operator leaves the vehicle the interior of the vehicle may be at a relatively safe temperature. The system notifies the driver in an extreme condition by sounding the horn. However, if the temperature subsequently rises or falls, the vehicle operator may be too far from the vehicle to hear the horn sounding.

It would therefore be desirable to provide an occupant sensing system that senses the presence of an occupant without the need for temperature sensing.

SUMMARY OF INVENTION

The present invention provides a system for detecting the presence of an occupant within a vehicle that has a seat belt sensor that generates a seat belt buckled signal and an ignition sensor generating an ignition-off signal. An indicator is also included in the system.

A controller is coupled to the seat belt sensor, the ignition sensor and the indicator. The controller controls the indicator in response to the seat belt buckled signal and the ignition-off signal.

In a further aspect of the invention, a method for detecting the presence of an occupant within an automotive vehicle comprises generating a seat belt buckled signal, generating an ignition-off signal, and activating an indicator in response to the seat belt buckled signal and the ignition-off signal.

One advantage of the present invention is that it is not dependent on the immediate interior or exterior temperature of the vehicle.

Another advantage of the invention is that various types of indicators include indication through a remote keyless device or cellular network.

Other advantages and features of the present invention will become apparent when viewed in light of the detailed description of the preferred embodiment when taken in conjunction with the attached drawings and appended claims.

DETAILED DESCRIPTION

Figure 1:
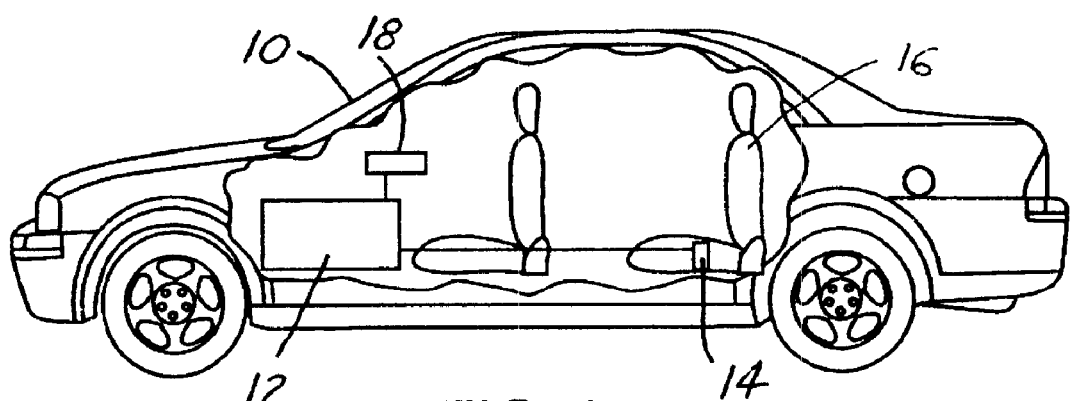
FIG. 1 is a partial cutaway view of an automotive vehicle having an occupant sensing system according to the present invention.

In the following figures, the same reference numerals will be used for the same components.

Referring now to FIG. 1, an automotive vehicle 10 has an occupant sensing system 12. Occupant sensing system 12 is coupled to a seat belt 14 for a passenger seat 16 of automotive vehicle 10. The occupant sensing system 12 is coupled to an ignition sensor 18. Ignition sensor 18 may, for example, have an ignition switch commonly used in automotive vehicles. The ignition switch is used to receive a key which allows a lock cylinder to rotate and activate the switch. The switch has an on position and an off position generating an on signal and off signal, respectively.

Figure 2:
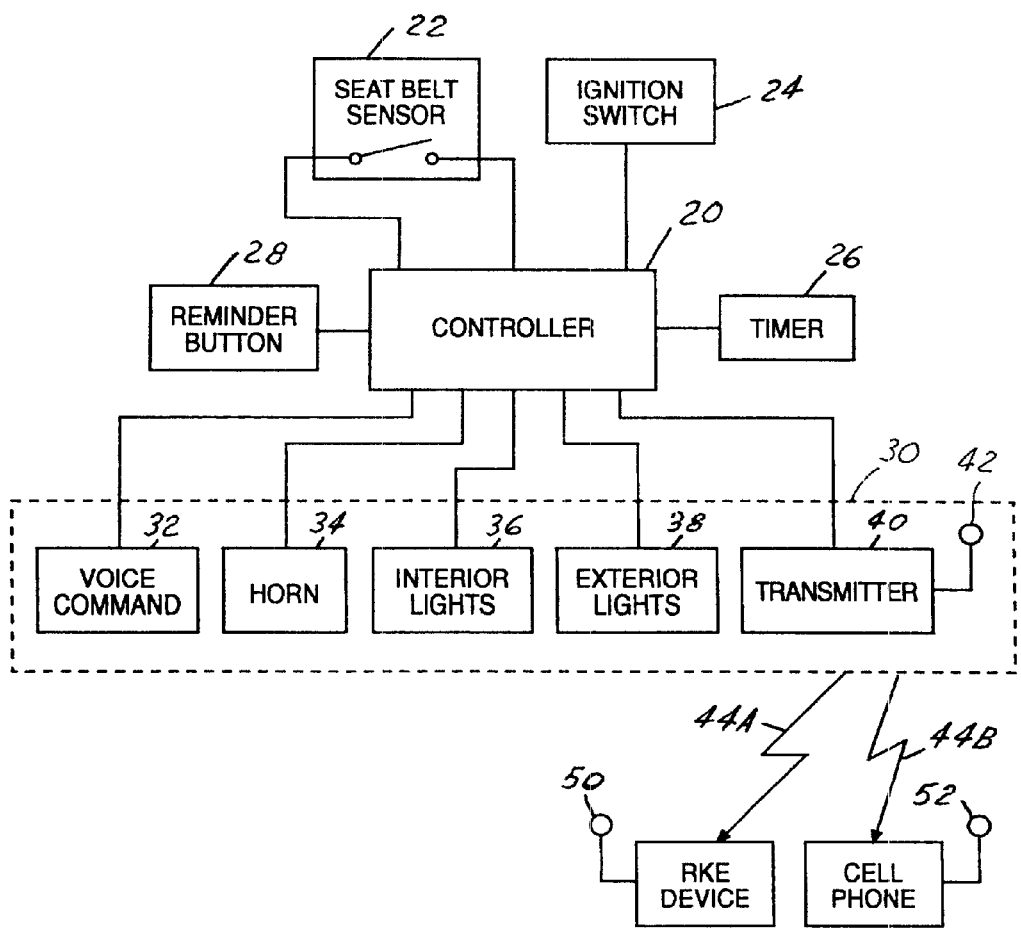
FIG. 2 is a block diagrammatic view of the sensing system of FIG. 1.

Referring now to FIG. 2, system 12 is illustrated in further detail. System 12 has a controller 20 that has various inputs and outputs. Controller 12 is preferably a microprocessor-based system having common elements such as a CPU internal memory, and an IO bus. Controller 20 is coupled to a seat belt sensor 22 positioned within the seat belt or seat belt buckle of FIG. 1. Seat belt sensor 22 generates a seat belt signal indicative of whether or not the seat belt is buckled. As shown, seat belt sensor 22 may be an electronic sensor or a continuity sensor such as a switch. In an unbuckled state, no signal is received while in a buckled state the switch is closed and an electrical signal is received at controller 20. The ignition system may also be coupled to controller 20 through an ignition switch 24. Ignition switch 24 generates an ignition-on signal when the ignition is on and an ignition-off signal when the ignition is off. The ignition-off signal may be the absence of an ignition-on signal. A timer 26 may also be coupled to controller 20. Timer 26 may be used to time various events. Timer 26 may be used to count up, count down, and provide relative timing. One example of a use for timer 26, as will be further described below, is for waiting a predetermined time from an event such as an ignition-off signal from ignition switch 24.

A reminder button 28 may also be coupled to controller 20. Reminder button 28 may enable and disable the occupant sensing system. For example, in some situations, child seats remain buckled in place and therefore the reminder button may be activated to disable the system once a reminder is generated.

Controller 20 may also be coupled to an indicator 30. Indicator 30 may take many forms or combination of forms. Indicator 30 may, for example, issue a voice command 32. Indicator may also be a horn or buzzer such as a car horn or buzzer 34. Indicator 30 may also include flashing the interior lights 36 or exterior lights 38. Controller 20 may also actuate a transmitter 40. Transmitter 40 has an antenna 42 used to generate communication signals 44A and 44B to a remote keyless entry device 46 or a cellular phone 48 through respective antennas 50 and 52. Cellular phone 48 may represent an actual cellular phone or other cellular device such as a paging device. Communication signal 44B may also be routed through a cell tower (not illustrated).

Figure 3:
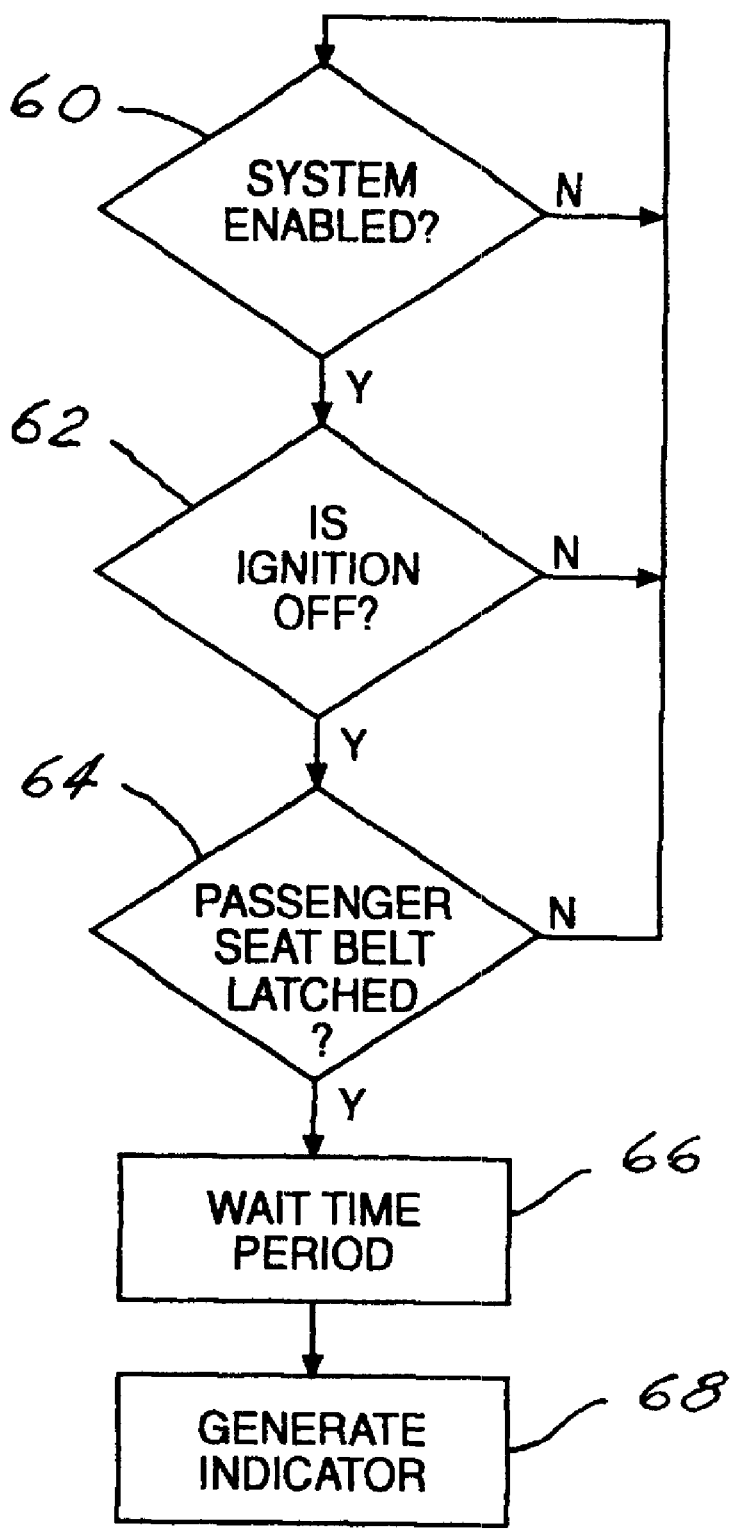
FIG. 3 is a flow chart of the operation of the sensing system according to the present invention.

Referring now to FIG. 3, the process begins in step 60. In step 60, controller determines whether the system is enabled. The system may automatically be enabled or may be enabled or disabled by the reminder button 28 described above. If the system is enabled, step 62 is executed. In step 62 if the ignition system is not on step 60 is re-executed. In step 62 if the ignition system is off as indicated by an ignition-off signal or the lack of an ignition-on signal, step 64 is executed. In step 64, if the passenger seat belt is not latched, step 60 is re-executed. In step 64, if the passenger seat belt is latched a time period may be waited in step 66. Step 66 is an optional step. That is, a time period need not be waited.

After step 66, an indicator signal generated by the controller is used to generate an indicator or actuate an indicator in step 68. As mentioned above, various combinations of indicators may be used. Various voice.commands provided over the audio system of the vehicle may be generated to remind the vehicle operator that a seat belt is still fastened which indicates a person is still within the vehicle. Likewise, a horn 34 may be activated as well as interior lights 36 or exterior lights 38. Of course, combinations of either may be used. A transmitter 40 may also be actuated to provide a reminder on a device such as a remote keyless entry device provided with a receiver or a cellular phone or paging device.

As can be seen, the present invention advantageously reminds the vehicle operator that another person is belted within the vehicle.

While particular embodiments of the invention have been shown and described, numerous variations and alternate embodiments will occur to those skilled in the art. Accordingly, it is intended that the invention be limited only in terms of the appended claims.

What is claimed is:

1. A system for detecting the presence of an occupant comprising:

a seat belt sensor generating a seat belt buckled signal;

an ignition sensor generating an ignition-off signal;

an indicator; and a controller coupled to the seat belt sensor, the ignition sensor and the indicator, said controlling said indicator in response to said seat belt buckled signal and ignitionoff signal.

2. A system as recited in claim 1 wherein said indicator comprises an audible indicator.

3. A system as recited in claim 2 wherein said audible indicator comprises a voice warning generator.

4. A system as recited in claim 1 wherein said indicator comprises an audible indicator and a visual indicator.

5. A system as recited in claim 1 wherein said indicator comprises a visual indicator.

6. A system as recited in claim 5 wherein said visual indicator comprises an interior light.

7. A system as recited in claim 5 wherein said visual indicator comprises an exterior light.

8. A system as recited in claim 1 wherein said indicator comprises a transmitter transmitting a warning signal through a cellular device.

9. A system as recited in claim 1 wherein said indicator comprises a transmitter transmitting a warning signal through a remote keyless entry device.

10. A system as recited in claim 1 wherein said seat belt sensor comprises a passenger seat belt sensor.

11. A system as recited in claim 1 further comprising a reminder button generating a reminder signal, said controller coupled the reminder button, said controlling said indicator in response to said seat belt buckled signal, ignitionoff signal and said reminder signal.

12. A system as recited in claim 1 further comprising a timer, said controller controlling said indicator in response to said seat belt buckled signal and a predetermined time counted by said timer from said ignitionoff signal.

13. An automotive vehicle comprising:

a passenger seat;

a passenger seat belt having a passenger seat belt sensor therein, said passenger seat belt sensor generating a seat belt buckled signal;

an ignition sensor generating an ignition-off signal;

an indicator; and a controller coupled to the passenger seat belt sensor, the ignition sensor and the indicator, said controlling said indicator in response to said seat belt buckled signal and ignitionoff signal.

14. A system as recited in claim 13 wherein said indicator comprises an audible indicator.

15. A system as recited in claim 13 wherein said indicator comprises an audible indicator and a visual indicator.

16. A system as recited in claim 13 wherein said indicator comprises a visual indicator.

17. A system as recited in claim 13 further comprising a reminder button generating a reminder signal, said controller coupled the reminder button, said controlling said indicator in response to said seat belt buckled signal, ignitionoff signal and said reminder signal.

18. A system as recited in claim 13 further comprising a timer, said controller controlling said indicator in response to said seat belt buckled signal and a predetermined time counted by said timer from said ignitionoff signal.

19. A method of detecting the presence of an occupant within an automotive vehicle comprising:

generating a seat belt buckled signal;

generating an ignition-off signal;

activating an indicator in response to said seat belt buckled signal and said ignition-off signal.

20. A method as recited in claim 19 wherein activating said indicator comprises activating said indicator after a predetermined time from said ignition-off signal.

* * * * *

UNITED STATES PATENT AND TRADEMARK OFFICE
CERTIFICATE OF CORRECTION

PATENT NO. : 6,489,889 B1
DATED : December 3, 2002
INVENTOR(S) : Craig Smith

It is certified that error appears in the above-identified patent and that said Letters Patent is hereby corrected as shown below:

Column 3,
Lines 30-38, claim 1 should read:
1. A system for detecting the presence of an occupant comprising:
a seat belt sensor generating a seat belt buckled signal;
an ignition sensor generating an ignition-off signal;
an indicator; and
a controller coupled to the seat belt sensor, the ignition sensor and the indicator, said controller controlling said indicator in response to said seat belt buckled signal and ignition-off signal.

Column 4,
Lines 6-10, claim 11 should read:
11. A system as recited in claim 1 further comprising a reminder button generating a reminder signal, said controller coupled to the reminder button, said controller controlling said indicator in response to said seat belt buckled signal, ignition-off signal and said reminder signal.

Lines 15-27, claim 13 should read:
13. An automotive vehicle comprising:
a passenger seat;
a passenger seat belt having a passenger seat belt sensor therein, said passenger seat belt sensor generating a seat belt buckled signal;
an ignition sensor generating an ignition-off signal;
an indicator; and
a controller coupled to the passenger seat belt sensor, the ignition sensor and the indicator, said controller controlling said indicator in response to said seat belt buckled signal and ignition-off signal.

UNITED STATES PATENT AND TRADEMARK OFFICE
CERTIFICATE OF CORRECTION

PATENT NO. : 6,489,889 B1
DATED : December 3, 2002
INVENTOR(S) : Craig Smith

It is certified that error appears in the above-identified patent and that said Letters Patent is hereby corrected as shown below:

<u>Column 4 cont'd,</u>
Lines 34-38, claim 17 should read:
17. A system as recited in claim 13 further comprising a reminder button generating a reminder signal, said controller coupled to the reminder button, said controller controlling said indicator in response to said seat belt buckled signal, ignition-off signal and said reminder signal.

Signed and Sealed this

Sixth Day of May, 2003

JAMES E. ROGAN
*Director of the United States Patent and Trademark Office*